(12) United States Patent
Hsu et al.

(10) Patent No.: US 10,054,750 B2
(45) Date of Patent: Aug. 21, 2018

(54) RAIL STRUCTURE FOR OPTICAL FIBER CASSETTE

(71) Applicant: ADVANCED-CONNECTEK INC., New Taipei (TW)

(72) Inventors: Huan-Pin Hsu, New Taipei (TW); Yan-Mei Chang, New Taipei (TW)

(73) Assignee: Advanced-Connectek Inc., New Taipei (TW)

( * ) Notice: Subject to any disclaimer, the term of this patent is extended or adjusted under 35 U.S.C. 154(b) by 65 days.

(21) Appl. No.: 15/605,236

(22) Filed: May 25, 2017

(65) Prior Publication Data

US 2017/0343756 A1 Nov. 30, 2017

(30) Foreign Application Priority Data

May 25, 2016 (CN) ...................... 2016 2 0482960 U

(51) Int. Cl.
| | |
|---|---|
| *G02B 6/00* | (2006.01) |
| *G02B 6/44* | (2006.01) |
| *A47B 88/423* | (2017.01) |
| *A47B 88/483* | (2017.01) |

(52) U.S. Cl.
CPC .......... *G02B 6/4453* (2013.01); *A47B 88/423* (2017.01); *A47B 88/483* (2017.01); *G02B 6/4455* (2013.01)

(58) Field of Classification Search
USPC ........................................................ 385/135
See application file for complete search history.

(56) References Cited

U.S. PATENT DOCUMENTS

| | | | | |
|---|---|---|---|---|
| 9,723,922 B2* | 8/2017 | Chen ..................... | A47B 88/493 |
| 2005/0025444 A1* | 2/2005 | Barnes ................... | A47B 88/08 |
| | | | | 385/135 |
| 2008/0282278 A1* | 11/2008 | Barkley ............... | G11B 33/126 |
| | | | | 720/672 |
| 2009/0129033 A1* | 5/2009 | Smrha .................... | H04Q 1/142 |
| | | | | 361/732 |
| 2015/0211574 A1* | 7/2015 | Chen ..................... | A47B 88/423 |
| | | | | 384/49 |

* cited by examiner

*Primary Examiner* — Eric Wong
(74) *Attorney, Agent, or Firm* — Muncy, Geissler, Olds & Lowe, P.C.

(57) ABSTRACT

A rail structure for optical fiber cassette is adapted to be assembled on a board member of a fiber box. The first engaging structure and the second engaging structure at two ends of the rail body are movably engaged with the first buckling structure and the second buckling structure. Hence, the user may detach one of the rail structures from the board member, so that the distance between the rest two of the rail structures goes wider, and the user can assemble another optical fiber cassette between the two rail structures, and the type and the size of the optical fiber cassette may be different from the detached one. Hence, the rail structure has wide applicability to allow the user to change the optical fiber cassette with different types and specifications conveniently and quickly.

15 Claims, 11 Drawing Sheets

RAIL STRUCTURE FOR OPTICAL FIBER CASSETTE

CROSS-REFERENCE TO RELATED APPLICATION

This non-provisional application claims priority under 35 U.S.C. § 119(a) to Patent Application No. 201620482960.0 filed in China, P.R.C. on May 25, 2016, the entire contents of which are hereby incorporated by reference.

FIELD OF THE INVENTION

The instant disclosure relates to a rail structure, and more particular to a rail structure for optical fiber cassette.

BACKGROUND

Internets are widely used. For short-distance transmission, the information is transmitted by coaxial cables. The transmission limitation for the coaxial cables is about 500 meters. On the other hand, for long-distance transmission, to ensure the safety and stability of the information, optical fibers are applied for the transmission.

Fiber-optic communication becomes a popular wireless communication means in which information to be transmitted is inputted in a transmitter at a transmitting end, and the information is superimposed or modulated to a carrier wave which is served as an information carrier, then the modulated carrier wave passes the transmission medium and transmitted to a receiving end at remote where a receiver is applied to demodulated the original information.

A conventional drawer-type receiving box includes an optical fiber cassette and an optical fiber adapter for inserting optical fiber plugs. The cassette is a drawer slibably movable relative to the rail structures at two sides of the space in the box. Hence, the cassette can be slid out for wire organization, repair and maintenance, and management. However, in the conventional, the rail structure is fixed by locking with screws. As a result, the rail structure cannot be detached from the box rapidly. Consequently, the distance between the two rail structures can be applied to an optical fiber cassette with a single width. Therefore, how to solve the aforementioned problem is an issue.

SUMMARY OF THE INVENTION

In view of this, an embodiment of the instant disclosure provides a rail structure for optical fiber cassette. The rail structure is adapted to be assembled on a board member of a fiber box. The rail structure comprises a rail body, a first engaging structure, and a second engaging structure. Two ends of the rail body respectively define a first end surface and a second end surface. A recessed rail track is formed on a lateral side of the rail body. The first engaging structure is formed on the first end surface of the rail body, and the second engaging structure is formed on the second end surface of the rail body. The first engaging structure is adapted to be movably engaged with a first buckling structure of the board member and the second engaging structure is adapted to be movably engaged with a second buckling structure of the board member.

In one embodiment, the first engaging structure comprises a first suspended arm outwardly extending from the first end surface. Furthermore, the first engaging structure comprises a hook outwardly protruding from an end portion of the first suspended arm, and the first engaging structure comprises a first buckling groove defined through the first suspended arm.

In one embodiment, the second engaging structure comprises a second suspended arm outwardly extending from the second end surface and a second buckling groove defined through the second suspended arm.

In one embodiment, the first engaging structure comprises a first slot inwardly recessed from the first end surface.

In one embodiment, the second engaging structure comprises a second slot inwardly recessed from the second end surface.

In one embodiment, the first buckling structure comprises a first buckling block outwardly extending from the board member.

In one embodiment, the first buckling structure comprises a first buckling hole formed on the board member. In addition, the first buckling structure comprises a first buckling block outwardly extending from an inner wall of the first buckling hole. Moreover, the first buckling structure comprises a first buckling portion protruding from the inner wall of the first buckling hole.

In one embodiment, the second buckling structure comprises a second buckling block outwardly extending from the board member.

In one embodiment, the second buckling structure comprises a second buckling hole formed on the board member. In addition, the second buckling structure comprises a second buckling block outwardly extending from an inner wall of the second buckling hole. Moreover, the second buckling structure comprises a second buckling portion protruding from the inner wall of the second buckling hole.

As above, the first engaging structure and the second engaging structure at the two ends of the rail body are movably engaged with the first buckling structure and the second buckling structure. Hence, the user may detach one of the rail structures from the board member, so that the distance between the rest two of the rail structures goes wider, and the user can assemble another optical fiber cassette between the two rail structures, and the type and the size of the optical fiber cassette may be different from the detached one. Hence, the rail structure has wide applicability to allow the user to change the optical fiber cassette with different types and specifications conveniently and quickly.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not imitative of the instant disclosure, wherein.

DETAILED DESCRIPTION

Figure 1:
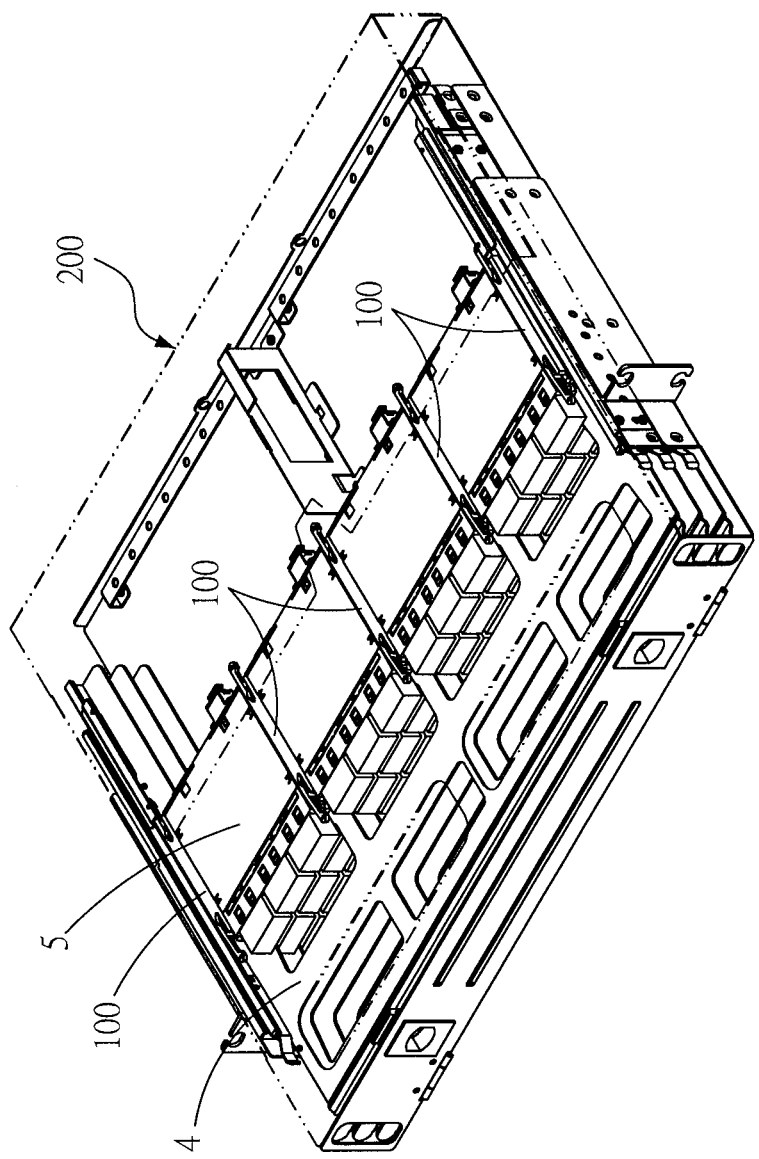
FIG. 1 illustrates a perspective view of a first embodiment of the instant disclosure.
Figure 2:
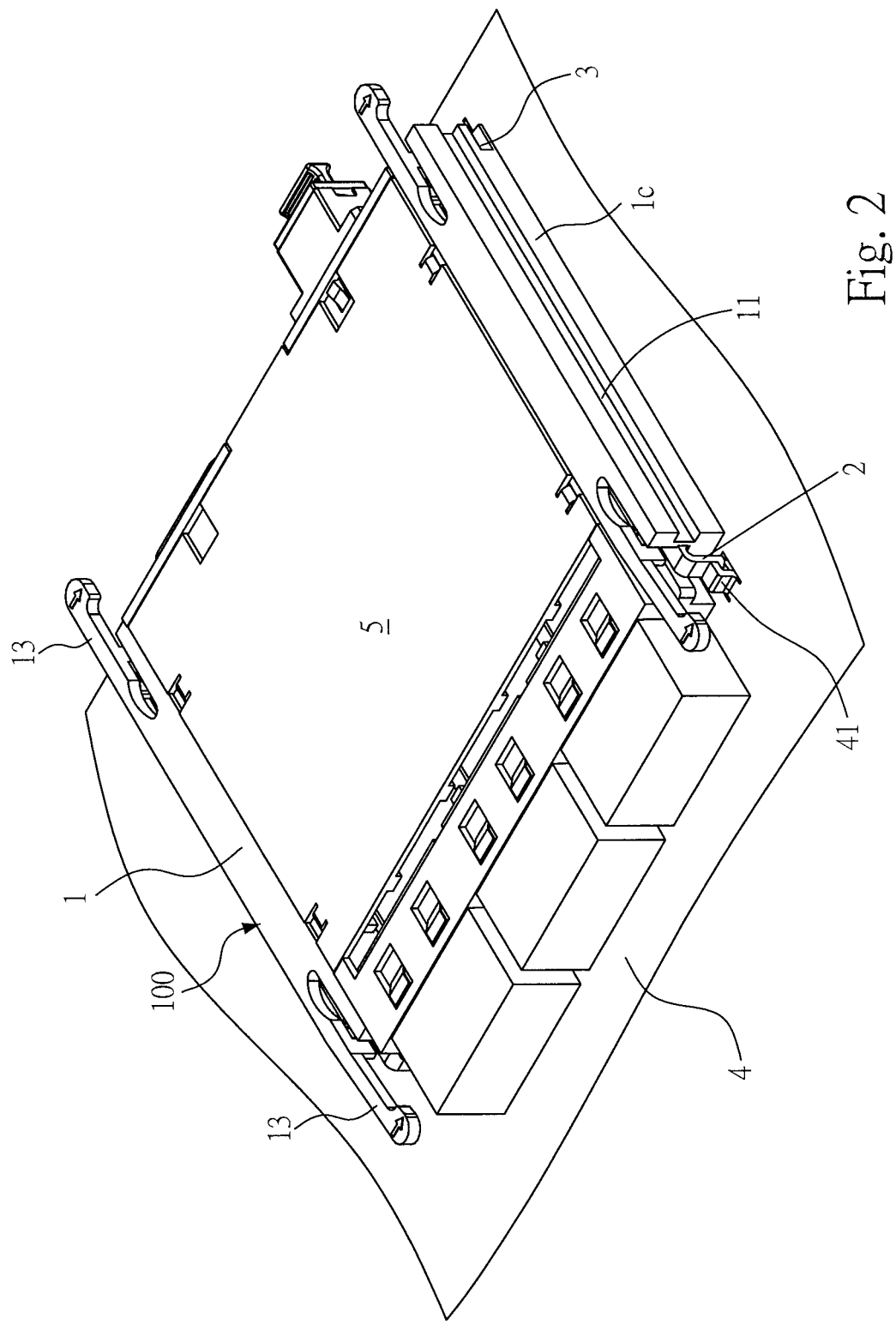
FIG. 2 illustrates a partial perspective view of the first embodiment.
Figure 3:
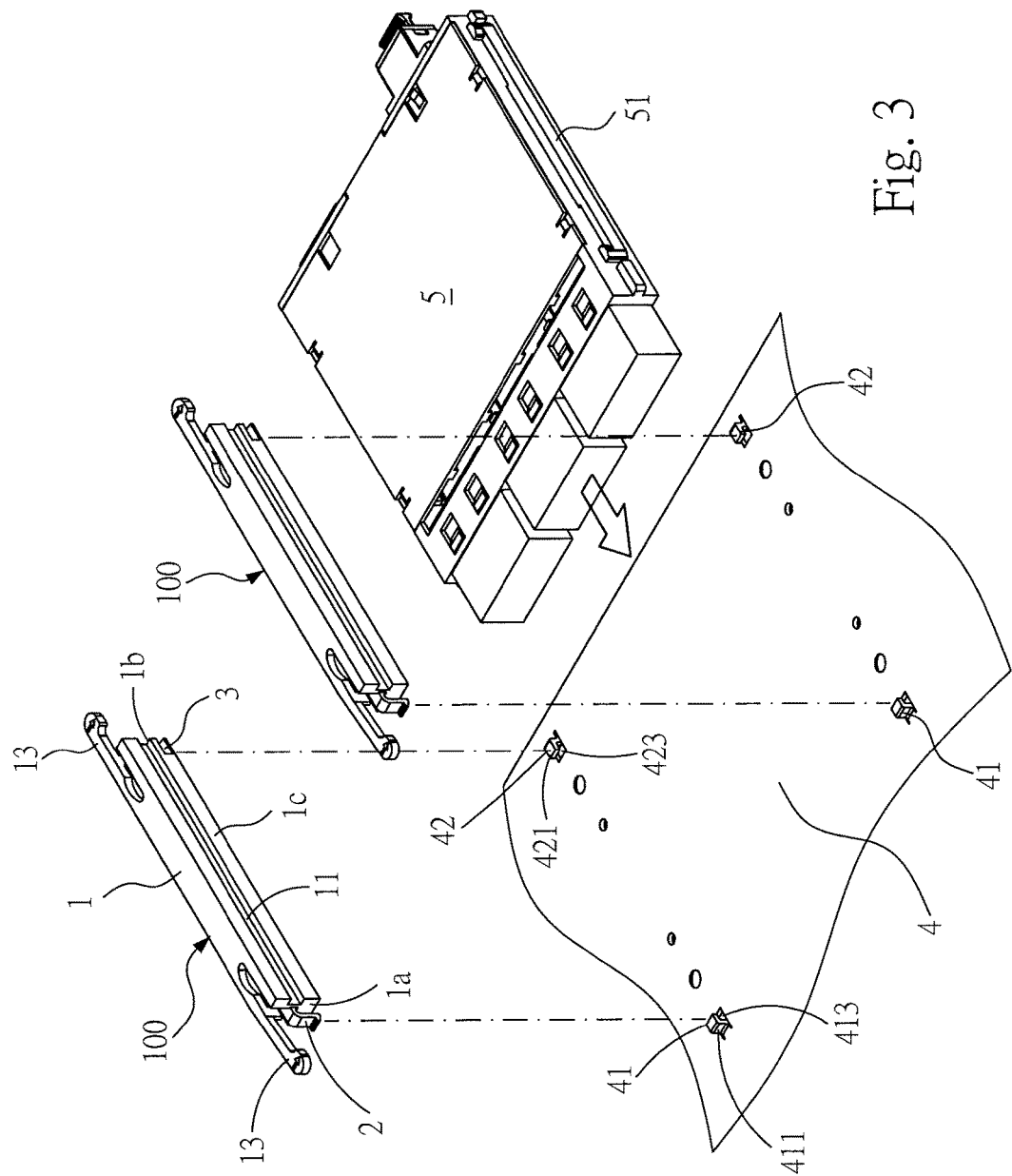
FIG. 3 illustrates a partial exploded view of the first embodiment.

Please refer to FIGS. 1 to 3, illustrating a rail structure 100 of a first embodiment of the instant disclosure. FIG. 1 illustrates a perspective view showing that several rail structures 100 are assembled in a fiber box 200, and in FIG. 1, the rail structures 100 are assembled on a board member 4. FIG. 2 illustrates a partial perspective view showing the rail structures 100 and an optical fiber cassette 5. FIG. 3 illustrates a partial exploded view showing the rail structure 100 and the optical fiber cassette 5. In this embodiment, the optical fiber cassette 5 is slidably assembled between two rail structures 100, and each of the rail structures 100 comprises a rail body 1, a first engaging structure 2, and a second engaging structure 3. The board member 4 has a first buckling structure 41 engaged with the first engaging structure 2 and a second buckling structure 42 engaged with the second engaging structure 3. In this embodiment, the optical fiber cassette 5 is assembled in a rack-type fiber box 200.

Figure 4:
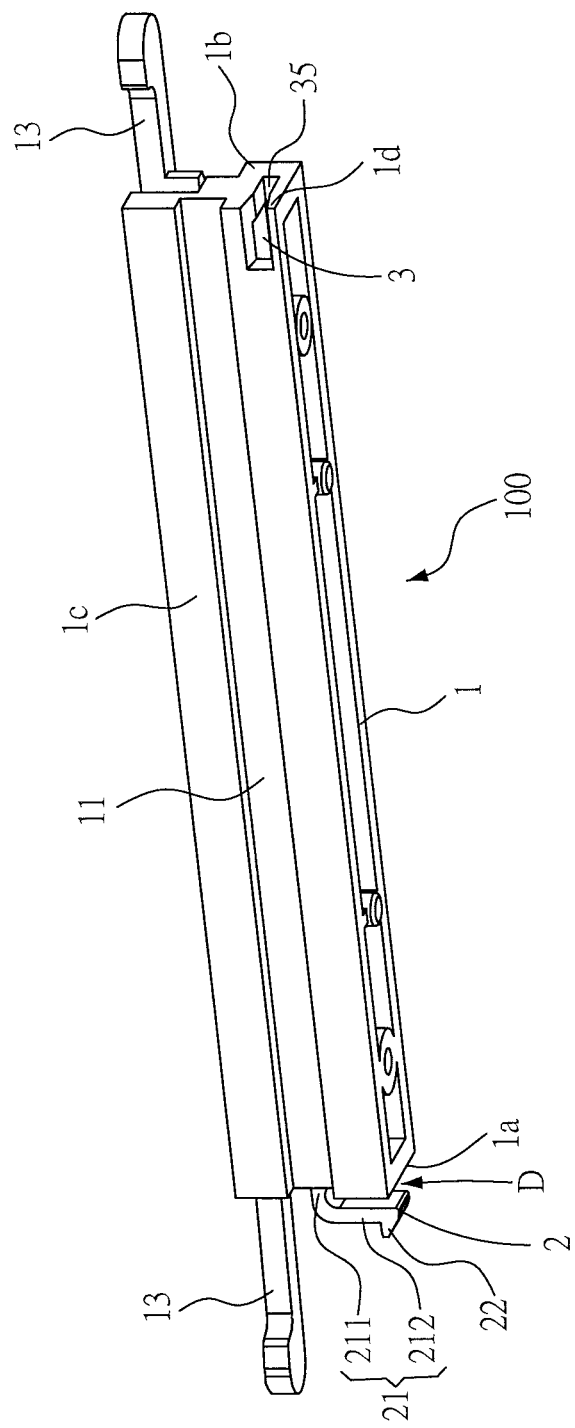
FIG. 4 illustrates a perspective view of a rail structure of the first embodiment.

Please refer to FIGS. 2 to 4. FIG. 4 illustrates a perspective view from the bottom of the rail structure 100 shown in FIG. 3. In this embodiment, the rail body 1 is made of plastics. The rail body 1 is an elongate plastic block, and two ends of the rail body 1, i.e., the short sides of the rail body 1 respectively define a first end surface 1a and a second end surface 1b. A lateral side 1c of the rail body 1, i.e., a long side of the rail body 1, forms a recessed rail track 11. A mating block 51 is protruding from a lateral side of the optical fiber cassette 5, and the mating block 51 is slidable relative to the recessed rail track 11. In this embodiment, two lateral sides 1c of each of the five rail bodies 1 form the recessed rail tracks 11, so that each of the four optical fiber cassettes 5 is slidable between the corresponding two rail bodies 1. In addition, the optical fiber cassettes 5 are aligned in an overlap manner to have three layers, so that twelve optical fiber cassettes 5 are placed in one fiber box 200. Moreover, two pull bars 13 are respectively outwardly extending from the first end surface 1a and the second end surface 1b of the rail body 1, and a user can take the optical fiber cassette 5 from the fiber box 200 by pulling the pull bar 13. In other words, the user may pull the optical fiber cassette 5 from the front side of the fiber box 200 or may pull the optical fiber cassette 5 from the rear side of the fiber box 200.

Please refer to FIGS. 2 to 4. In this embodiment, the first engaging structure 2 is formed on the first end surface 1a of the rail body 1. In this embodiment, the first engaging structure 2 comprises a first suspended arm 21 outwardly extending from the first end surface 1a. The first suspended arm 21 comprises an extension portion 211 and a swingable arm 212. The extension portion 211 is extending from the first end surface 1a outwardly and horizontally by a length, and the swingable atm 212 is extending from an end portion of the extension portion 211 and bent downwardly. An angle between the extension portion 211 and the swingable arm 212 is about 90 degrees. In addition, a distance D is between the swingable arm 212 and the first end surface 1a. Furthermore, the first engaging structure 2 comprises a hook 22 outwardly protruding from an end portion of the first suspended arm 21. The hook 22 is protruding from an outer lateral surface of the end portion of the first suspended arm 21. When the swingable arm 212 is pressed by a tool, the swingable arm 212 is swung toward the first end surface 1a taking the extension portion as a fulcrum, and the hook 22 can be detached from the first buckling structure 41 when the swingable arm 212 is moved toward the first end surface 1a by the distance D.

Please refer to FIGS. 2 to 4. In this embodiment, the second engaging structure 3 is formed on the second end surface 1b of the rail body 1. In this embodiment, the second engaging structure 3 comprises a second slot 35 inwardly recessed from the second end surface 1b. The second slot 35 is defined through the lateral side 1c of the rail body 1. In other words, the second slot 35 is formed on the corner 1d between the long side and the short side of the rail body 1. In addition, the width of the second slot 35 is reduced from the opening to the bottom, so that the second buckling structure 42 can be engaged with the second slot 35 conveniently.

Figure 5:
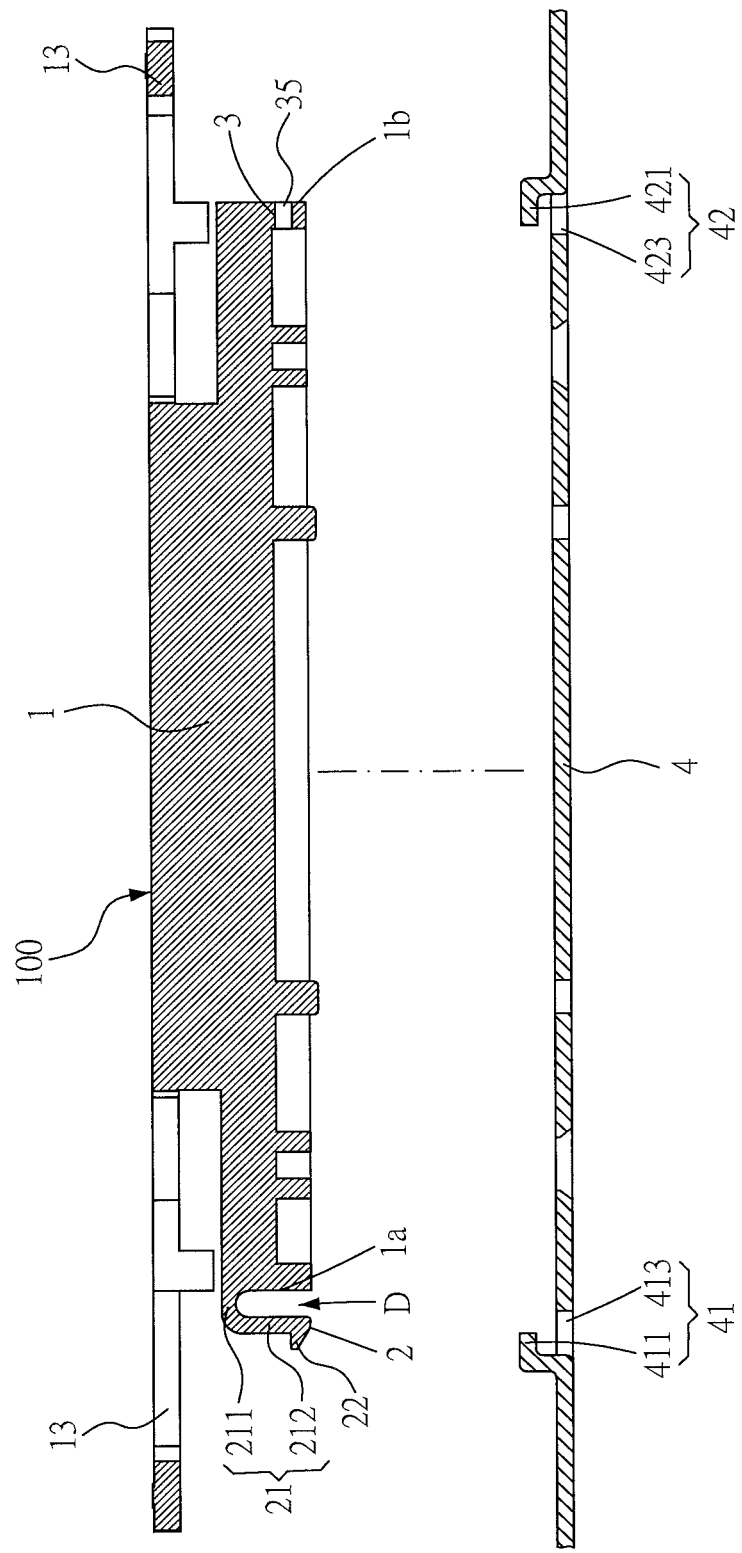
FIG. 5 illustrates a sectional exploded view (1) of the rail structure and a board member of the first embodiment.

Please refer to FIGS. 2, 3, and 5. FIG. 5 illustrates a sectional exploded view showing that the rail structure 100 and the board member 4 are to be assembled with each other. In this embodiment, the first buckling structure 41 of the board member 4 comprises a first buckling hole 413 formed on the board member 4 and a first buckling block 411 outwardly extending from an inner wall of the first buckling hole 413. The first buckling block 411 is adapted to be engaged with the hook 22. The second buckling structure 42 of the board member 4 comprises a second buckling hole 423 formed on the board member 4 and a second buckling block 421 outwardly extending from an inner wall of the second buckling hole 423. The second buckling block 421 is adapted to be engaged with the second slot 35.

Figure 6:
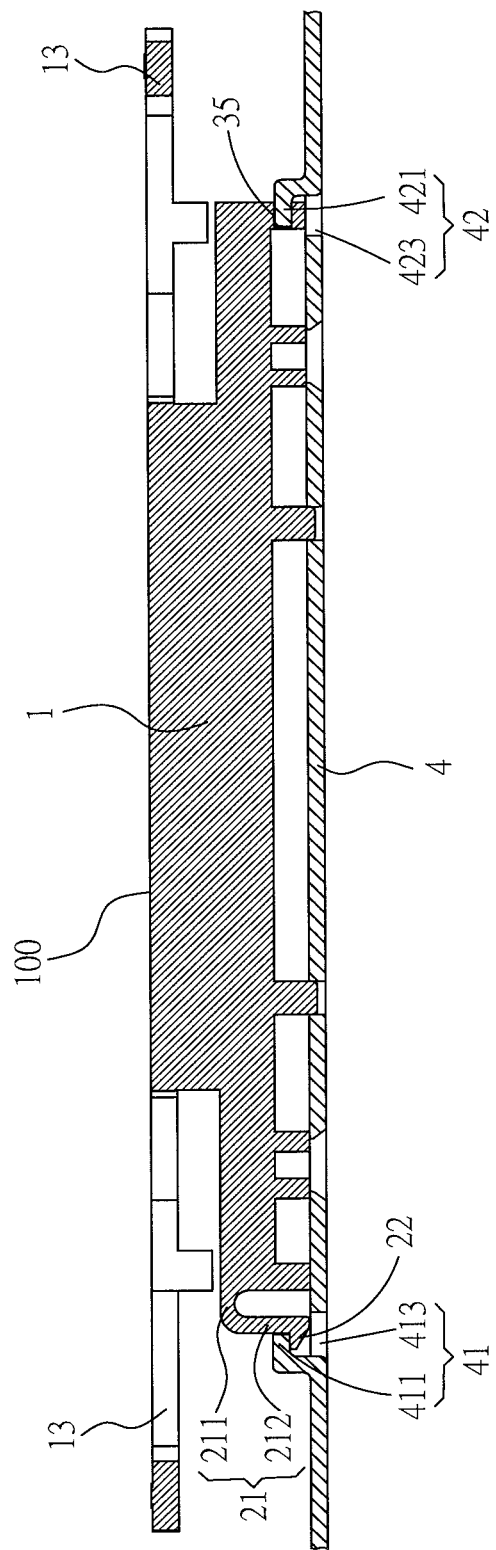
FIG. 6 illustrates a sectional exploded view (2) of the rail structure and the board member of the first embodiment.
Figure 7:
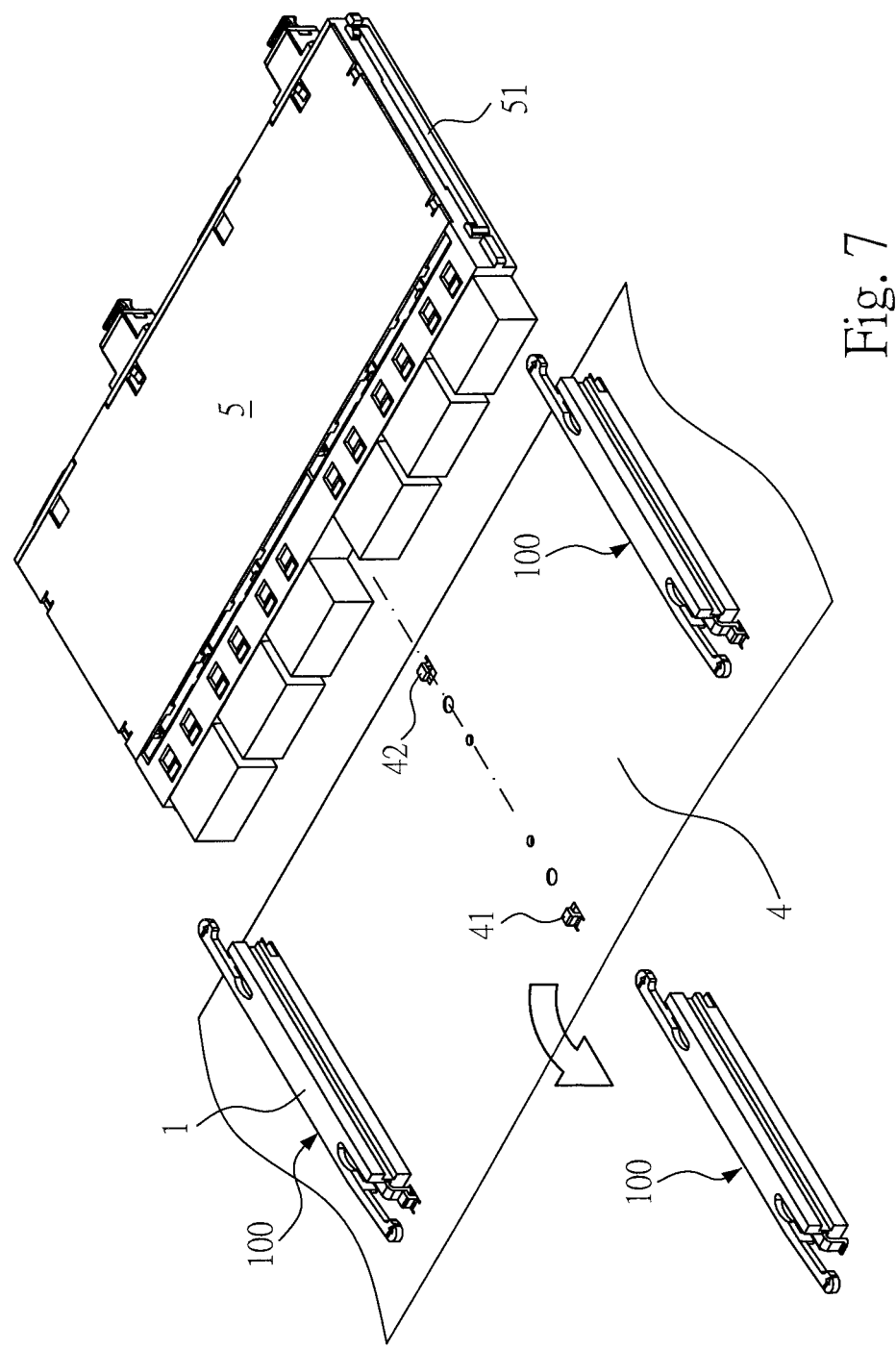
FIG. 7 illustrates an exploded view of the first embodiment showing that one rail structure is detached from the board member.

Please refer to FIGS. 5 to 7. FIG. 6 illustrates a sectional exploded view showing that the rail structure 100 and the board member 4 are assembled with each other. FIG. 7 illustrates an exploded view showing that one rail structure 100 is detached from the board member 4. In this embodiment, to assemble the rail body 1 with the board member 4, the rail body 1 is firstly placed on the board member 4. And then, the second engaging structure 3 at the rear end of the rail body 1 is engaged with the second buckling structure 42, next the first engaging structure 2 at the front end of the rail body 1 is engaged with the first buckling structure 41. Hence, the rail body 1 can be fixed with the board member 4. To detach the rail body 1 from the board member 4, the first engaging structure 2 at the front end of the rail body 1 is pressed, so that the hook 22 is detached from the first buckling block 411. Briefly, the first engaging structure 2 is movably engaged with the first buckling structure 41 of the board member 4, and the second engaging structure 3 is movably engaged with the second buckling structure 42 of the board member 4. Furthermore, the user may detach one of the rail structures 100 from the board member 4, so that the distance between the rest two of the rail structures 100 goes wider, and the user can assemble another optical fiber cassette 5 between the two rail structures 100, and the type and the size of the optical fiber cassette 5 may be different from the detached one. Hence, the rail structure 100 has wide applicability to allow the user to change the optical fiber cassette 5 with different types and specifications conveniently and quickly.

Figure 8:
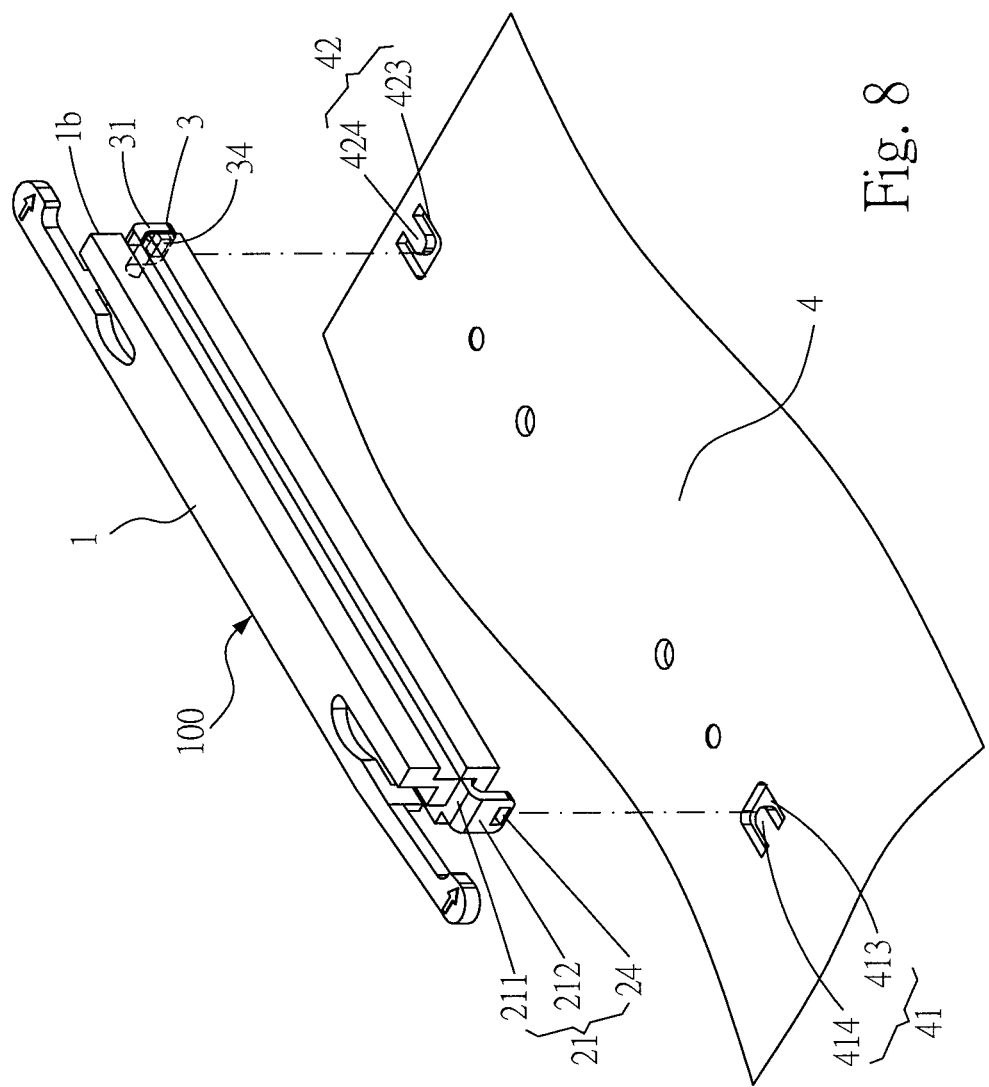
FIG. 8 illustrates a partial exploded view of a rail structure and a board member of a second embodiment of the instant disclosure.

Please refer to FIG. 8, illustrating a second embodiment of the instant disclosure. FIG. 8 illustrates a partial exploded view showing the rail structure 100 and the board member 4. In this embodiment, the first engaging structure 2 comprises a first buckling groove 24 defined through the first suspended arm 21. In addition, the second engaging structure 3 comprises a second suspended arm 31 outwardly extending from the second end surface 1b and a second buckling groove 34 defined through the second suspended arm 31. In this embodiment, the structure of the first engaging structure 2 is approximately the same as that of the second engaging structure 3, and the first buckling structure 41 comprises a first buckling portion 414 protruding from an inner wall of the first buckling hole 413, and the first buckling portion 414 is adapted to be engaged with the first buckling groove 24. The second buckling structure 42 comprises a second buckling portion 424 protruding from an inner wall of the second buckling hole 423, and the second buckling portion 424 is adapted to be engaged with the second buckling groove 34.

Figure 9:
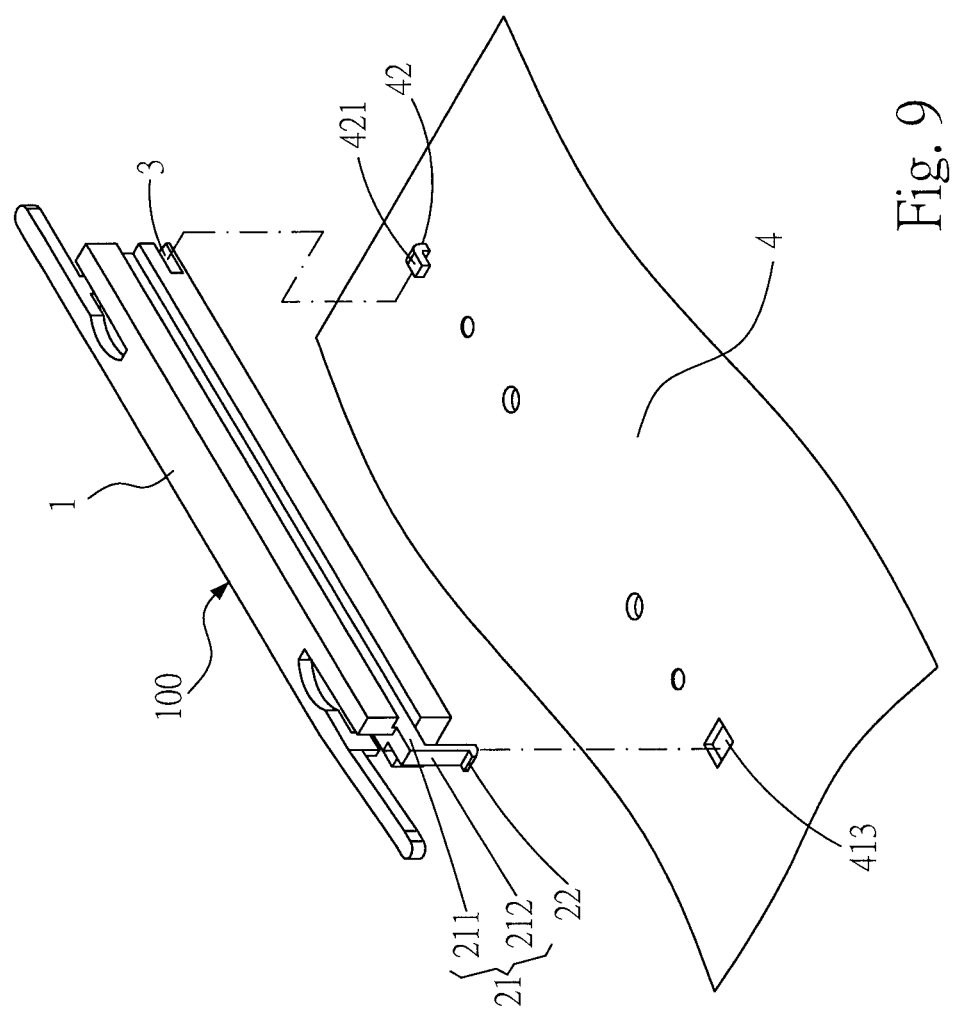
FIG. 9 illustrates a partial exploded view of a rail structure and a board member of a third embodiment of the instant disclosure.

Please refer to FIG. 9, illustrating a third embodiment of the instant disclosure. FIG. 9 illustrates a partial exploded view showing the rail structure 100 and the board member 4. In this embodiment, the hook 22 of the first engaging structure 2 directly passes through the first buckling hole 413 to be engaged with a bottom surface of the board member 4, and the first buckling hole 413 is formed on the surface of the board member 4. In addition, the second buckling structure 42 comprises a second buckling block 421 outwardly extending from the board member 4, and the second buckling block 421 is directly protruding from the surface of the board member 4.

Figure 10:
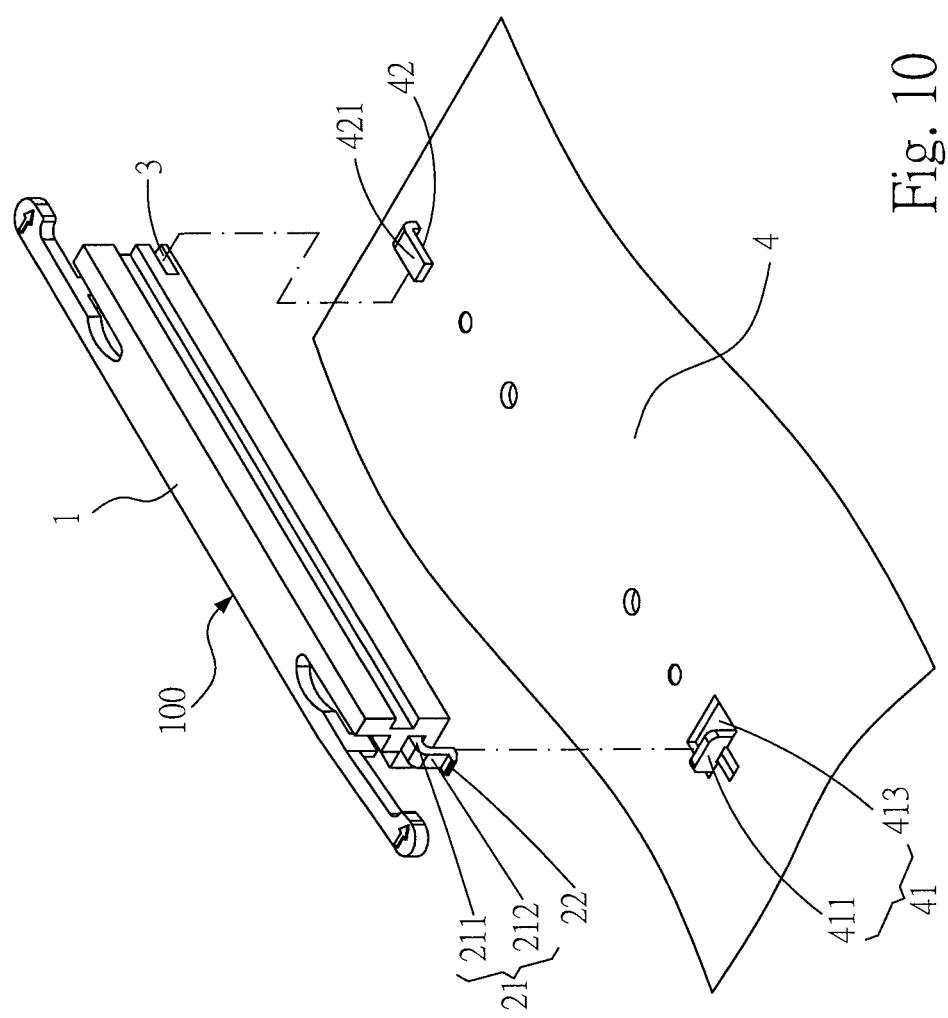
FIG. 10 illustrates a partial exploded view of a rail structure and a board member of a fourth embodiment of the instant disclosure.

Please refer to FIG. 10, illustrating a fourth embodiment of the instant disclosure. FIG. 10 illustrates a partial exploded view showing the rail structure 100 and the board member 4. In this embodiment, the first buckling block 411 of the first buckling structure 4 is protruding from an inner wall of the first buckling hole 413. The first buckling block 411 is perpendicular with the board member 4, and the inner side of the first buckling block 411 is provided for engaging with the hook 22. In addition, the second buckling structure 42 comprises a second buckling block 421 outwardly extending from the board member 4, and the second buckling block 421 is directly protruding from the surface of the board member 4.

Figure 11:
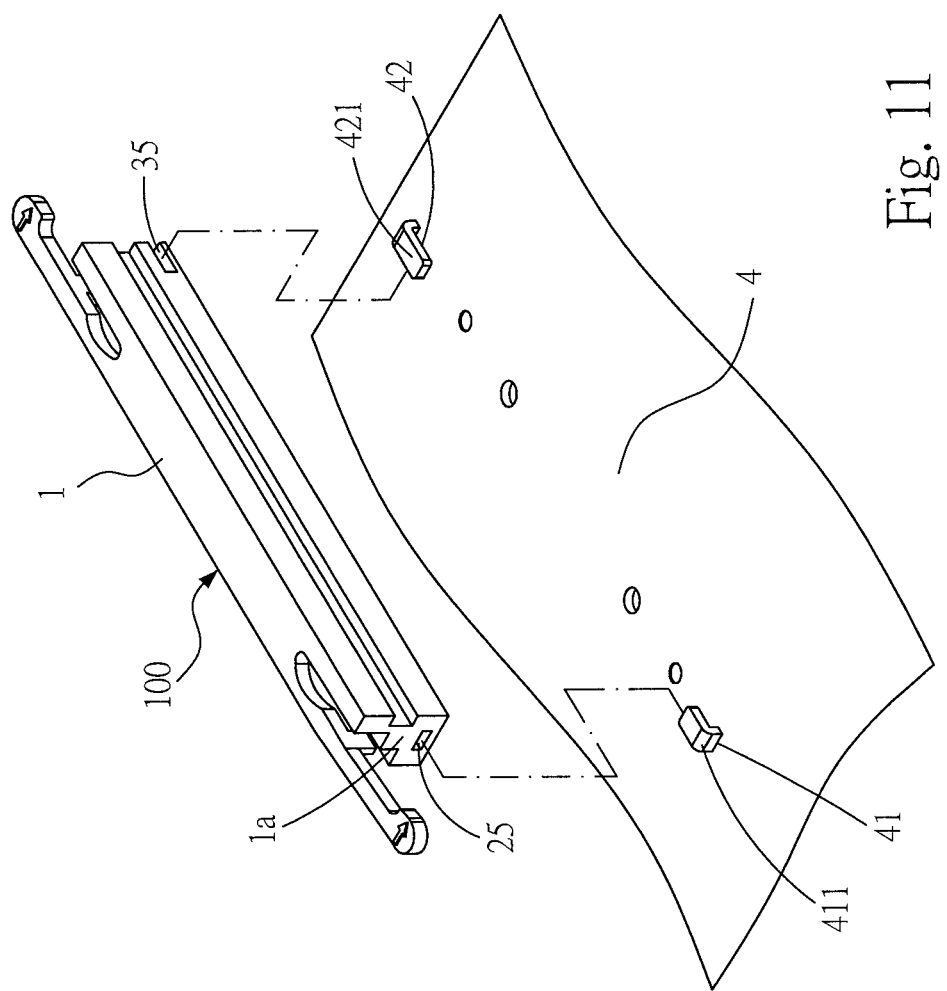
FIG. 11 illustrates a partial exploded view of a rail structure and a board member of a fifth embodiment of the instant disclosure.

Please refer to FIG. 11, illustrating a fifth embodiment of the instant disclosure. FIG. 11 illustrates a partial exploded view showing the rail structure 100 and the board member 4. In this embodiment, the first engaging structure 2 comprises a first slot 25 inwardly recessed from the first end surface 1a, and the first buckling structure 41 comprises a first buckling block 411 outwardly protruding from the board member 4. The second buckling structure 42 comprises a second buckling block 421 outwardly protruding from the board member 4, and the second buckling block 421 is directly protruding from the surface of the board member 4. In assembling, the rail body 1 is inclinedly aligned relative to the board member 4, and then, the first buckling block 411 is inserted into the first slot 25, next, the rail body 1 is posed. And, the second buckling block 421 is engaged with the second slot 35.

It is understood that, the first engaging structure 2 may be a hook structure or a buckling hole structure, and the first buckling structure 41 may be a hook structure or a buckling hole structure. In addition, the second engaging structure 3 may be a hook structure or a buckling hole structure, and the second buckling structure 42 may be a hook structure or a buckling hole structure.

As above, the first engaging structure and the second engaging structure at the two ends of the rail body are movably engaged with the first buckling structure and the second buckling structure. Hence, the user may detach one of the rail structures from the board member, so that the distance between the rest two of the rail structures goes wider, and the user can assemble another optical fiber cassette between the two rail structures, and the type and the size of the optical fiber cassette may be different from the detached one. Hence, the rail structure has wide applicability to allow the user to change the optical fiber cassette with different types and specifications conveniently and quickly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A rail structure for an optical fiber cassette, adapted to be assembled on a board member of a fiber box, wherein the rail structure comprises:
   a rail body, two ends thereof respectively defining a first end surface and a second end surface, wherein the rail body is an elongated block and a recessed rail track is formed on a lateral side of the rail body, wherein the recessed rail track receives a slidable mating block which protrudes from a lateral side of the optical fiber cassette and is slidable relative to the recessed rail track such that the optical fiber cassette is slidably assembled between two of the rail structures;
   a first engaging structure formed on the first end surface of the rail body; and
   a second engaging structure formed on the second end surface of the rail body;
   wherein the first engaging structure is adapted to be movably engaged with a first buckling structure of the board member and the second engaging structure is adapted to be movably engaged with a second buckling structure of the board member.

2. The rail structure for optical fiber cassette according to claim 1, wherein the first engaging structure comprises a first suspended arm outwardly extending from the first end surface.

3. The rail structure for optical fiber cassette according to claim 2, wherein the first engaging structure comprises a hook outwardly protruding from an end portion of the first suspended arm.

4. The rail structure for optical fiber cassette according to claim 2, wherein the first engaging structure comprises a first buckling groove defined through the first suspended arm.

5. The rail structure for optical fiber cassette according to claim 1, wherein the second engaging structure comprises a second suspended arm outwardly extending from the second end surface and a second buckling groove defined through the second suspended arm.

6. The rail structure for optical fiber cassette according to claim 1, wherein the first engaging structure comprises a first slot inwardly recessed from the first end surface.

7. The rail structure for optical fiber cassette according to claim 1, wherein the second engaging structure comprises a second slot inwardly recessed from the second end surface.

8. The rail structure for optical fiber cassette according to claim 1, wherein the first buckling structure comprises a first buckling block outwardly extending from the board member.

9. The rail structure for optical fiber cassette according to claim 1, wherein the first buckling structure comprises a first buckling hole formed on the board member.

10. The rail structure for optical fiber cassette according to claim 9, wherein the first buckling structure comprises a first buckling block outwardly extending from an inner wall of the first buckling hole.

11. The rail structure for optical fiber cassette according to claim 9, wherein the first buckling structure comprises a first buckling portion protruding from an inner wall of the first buckling hole.

12. The rail structure for optical fiber cassette according to claim 1, wherein the second buckling structure comprises a second buckling block outwardly extending from the board member.

13. The rail structure for optical fiber cassette according to claim 1, wherein the second buckling structure comprises a second buckling hole formed on the board member.

14. The rail structure for optical fiber cassette according to claim 13, wherein the second buckling structure comprises a second buckling block outwardly extending from an inner wall of the second buckling hole.

15. The rail structure for optical fiber cassette according to claim 13, wherein the second buckling structure comprises a second buckling portion protruding from an inner wall of the second buckling hole.

* * * * *